United States Patent Office.

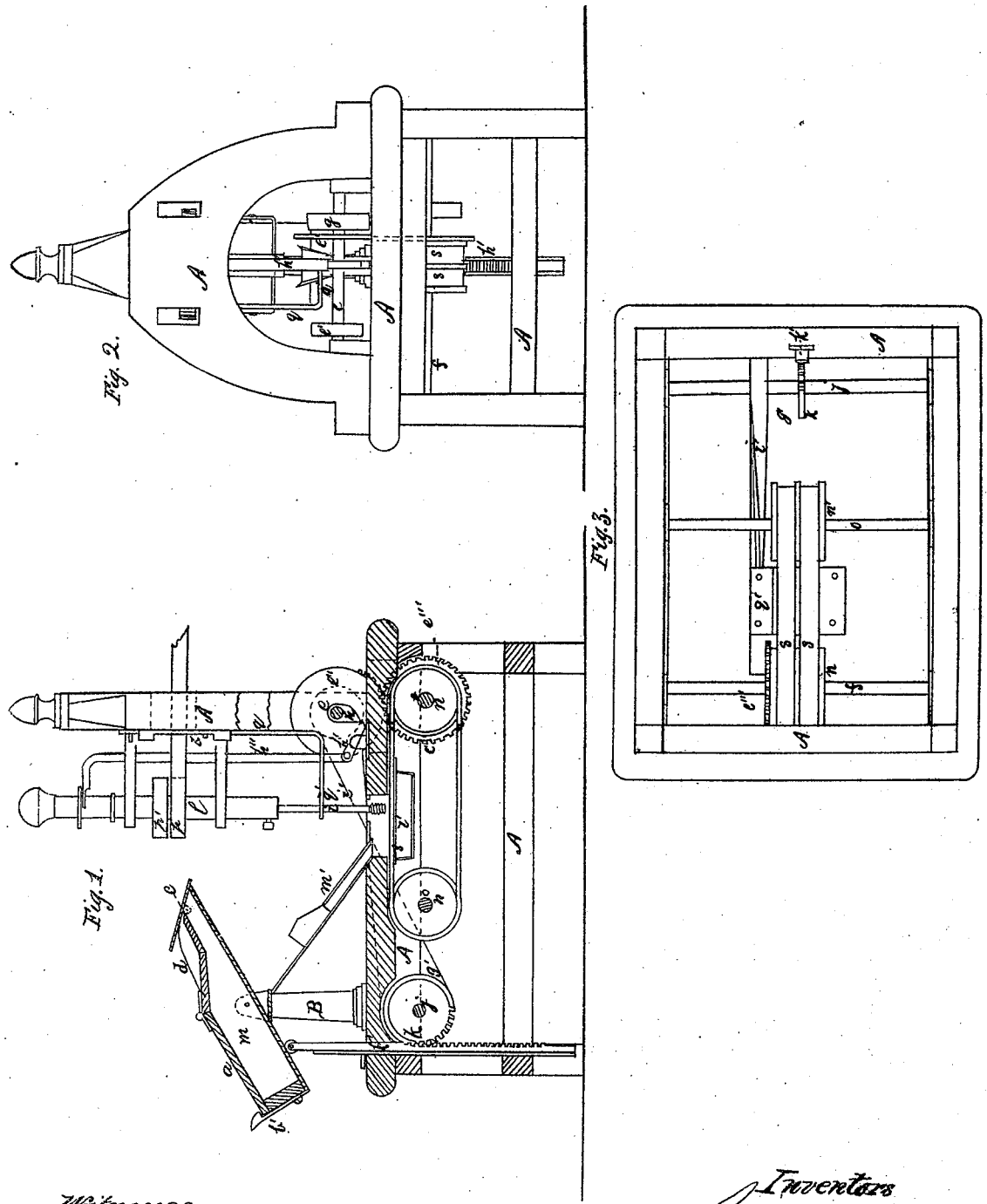

HUBERT C. HART AND JOHN R. BLAKESLEE, OF UNIONVILLE, CONNECTICUT, ASSIGNORS TO HUBERT C. HART AND LUTHER T. MOSES, OF SAME PLACE.

Letters Patent No. 72,487, dated December 24, 1867.

IMPROVEMENT IN TAPPING NUTS.

The Schedule referred to in these Letters Patent and making part of the same.

TO ALL WHOM IT MAY CONCERN:

Be it known that we, HUBERT C. HART and JOHN R. BLAKESLEE, both of Unionville, county of Hartford, and State of Connecticut, have invented certain new and useful Improvements in Automatic Nut-Tapping Machines; and to enable others skilled in the art to make and use the same, we will proceed to describe its construction and operation by referring to the drawings, in which the same letters indicate like parts in each of the figures.

The nature of this invention will be understood from the specification and drawings. In the accompanying drawings—

Figure 1 is a front side elevation, partly in section.
Figure 2 is a right-hand end elevation.
Figure 3 is an under side view.

A is the framework of the machine. B is a standard, to the upper end of which the nut-receiving and nut-feeding box is secured and oscillates. This box is provided with a hinge-lid, $a$, which is held firmly in a closed position by a spring-catch, $b$. $c$ is a hinged cap, held in a closed position by the action of a spring, $d$, or its equivalent, for holding the nuts back in readiness to drop therefrom. $e$ is a driving-shaft, which takes its bearing in boxes elevated above the bed of the machine. $e'$ is the driving-pulley arranged on said shaft. $e''$ is a wheel having gear teeth, which occupy about one-twelfth of the periphery of said wheel, which periodically works into the gear-wheel $e'''$, arranged directly underneath the wheel $e''$ upon the shaft $f$. $g$ is a pulley arranged upon the shaft $e$, close by the side of the wheel $e''$. $h$ is a cam arranged upon the shaft $e$, the object of which is to elevate the spindle $l$ by means of a lever, $h'$, and rod, $h''$, so as to allow a new nut to pass directly under and in readiness for the action of the tapping-tool $i$, in quick succession, after one has been tapped. A link-chain or belt, $i'$, passes around the pulley $g$ on the shaft $e$, thence around the pulley $g'$, secured on the shaft $j$, which has its bearings in the framework. $k$ is a wheel having gear-teeth upon about one-fourth of its periphery. Said wheel is secured to the shaft $j$. The teeth of this gear are designed to work into the lifting-rack $k'$ at about the same time that the gear $e''$, through the cam $h$, lever $h'$, and rod $h''$, lift the tapping-spindle $l$, the object of which is to lift the back end of the nut-box $m$, so that the lower end of the cap $c$ will strike the upper side of the conductor-box $m'$ and allow one or more nuts to escape therefrom into said conductor $m'$. $n$ and $n'$ are groove-pulleys arranged upon the shafts $f$ and $o$. Belts of metal, or leather, or other suitable material, are secured over said pulleys, in the grooves, for the purpose of conveying the nuts along from the conductor $m'$ to the tapping-tool $i$ secured in the spindle $l$. The power is applied to the spindle $l$ by means of a belt, which passes around the pulleys $p\ p'$, one of which, $p'$, is a loose pulley. $q$ is a belt-guide, the lower prong $q'$ of which is perforated to receive the shank of the tapping-tool $i$, so that when a given number of nuts have been tapped, and pressed upward, one after the other, against the under side of the prong $q'$ of the shipper or guide $q$, the belt will be changed from the tight to the loose pulley. The motion of the machine will be stopped while the tapping-tool is removed from the spindle, and the nuts removed therefrom, and the tapping-tool again replaced in the spindle. $r'$ is an oil-box, arranged directly under the tapping-tool. $s\ s$ are conducting or conveying-belts, which pass over the pulleys $n\ n'$, which act periodically with the lifting of the tapping-tool, and the discharge-action of the nut-box to move a new nut directly under the tapping-tool. In a practical machine, side guide-ways are employed to prevent the nut from turning while being tapped, and a stop to prevent the further forward movement thereof when directly under the tapping-tool. Now, it will be seen that when the nuts are placed in the hopper or box $m$, the lower edge of the cap $c$ will strike against the upper side of the conductor-box $m'$, which then opens and allows the nuts to slide freely into said conductor to fill its capacity up to the one being tapped; the nuts thus resting one against another upon the belts $s\ s$ between ways, and kept in that position by the alternate action of the tapping-tool $i$, elevating one at a time successively, and the supply from the nut-box $m'$ and the joint action of the belts $s\ s$.

We believe we have thus shown the nature, construction, and operation of this invention, so as to enable others skilled to make and use the same therefrom.

What we claim, therefore, and desire to secure by Letters Patent, is—